(12) United States Patent
Wong et al.

(10) Patent No.: US 8,733,173 B2
(45) Date of Patent: May 27, 2014

(54) ULTRASONIC IMAGING USING THIN FILM TRANSISTOR BACKPLANE

(71) Applicant: Palo Alto Research Center Incorporated, Palo Alto, CA (US)

(72) Inventors: Serena Han Ying Wong, Menlo Park, CA (US); Jeng Ping Lu, Fremont, CA (US); Raj B. Apte, Palo Alto, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 0 days.

(21) Appl. No.: 13/867,946

(22) Filed: Apr. 22, 2013

(65) Prior Publication Data

US 2013/0235698 A1 Sep. 12, 2013

Related U.S. Application Data

(62) Division of application No. 12/965,784, filed on Dec. 10, 2010, now Pat. No. 8,539,837.

(51) Int. Cl.
*G01N 29/24* (2006.01)

(52) U.S. Cl.
USPC .......................................................... 73/628

(58) Field of Classification Search
USPC ................... 73/614, 626, 628, 641; 600/459
See application file for complete search history.

(56) References Cited

U.S. PATENT DOCUMENTS 5,483,963 A * 1/1996 Butler et al. .................. 600/437

\* cited by examiner

*Primary Examiner* — John Chapman, Jr.
(74) *Attorney, Agent, or Firm* — Blakely Sokoloff Taylor & Zafman LLP

(57) ABSTRACT

An embodiment is a method and apparatus for coherent ultrasonic imaging. A receiver array has a plurality of receiver elements on a substrate to detect in-phase and quadrature components of a received signal corresponding to a transmit signal. Each of the receiver elements includes a receiver transducer and a thin-film transistor (TFT) receiver circuit. The TFT receiver circuit includes a quadrature detector having a mixer to mix a received signal with a reference signal in a composite bias signal that is distributed across the plurality of receiver elements. A transmitter is acoustically coupled to the plurality of receiver elements to generate the transmit signal through an imaging medium.

3 Claims, 10 Drawing Sheets

ULTRASONIC IMAGING USING THIN FILM TRANSISTOR BACKPLANE

CROSS-REFERENCES TO RELATED APPLICATIONS

This is a Divisional Application of U.S. application Ser. No. 12/965,784, filed on Dec. 10, 2010. This Divisional Application claims the benefit of U.S. application Ser. No. 12/965,784.

TECHNICAL FIELD

The presently disclosed embodiments are directed to the field of semiconductor devices, and more specifically, to ultrasonic imaging using thin film transistor technology.

BACKGROUND

Apertures for coherent ultrasound two-dimensional (2D) arrays are increasing in size to eliminate the operator dependence of the image acquisition and to provide the high resolution needed for imaging at a distance. However, as aperture size increases, the number of elements increases along with the data collected.

C-mode systems provide intuitive, first-person images and reduce the data collected. Most of the existing techniques for C-mode ultrasound devices have a number of disadvantages when trying to scale to larger scale, lower cost devices. Larger scale devices benefit from larger aperture size, which directly improves resolution. Current Applications Specific Integrated Circuits (ASIC) technology, however, has moved in the opposite direction, to smaller dice, which lead to lower resolutions. It is, therefore, advantageous to utilize thin film transistor (TFT) technology which is scalable to large areas. U.S. Patent Application No. 2007/0016022 and U.S. Pat. No. 7,402,136 describe a technique to coherently image by directly sampling quadrature and in-phase components from a radio frequency (RF) signal. This technique requires a high sampling rate that is not suitable for polysilicon thin film transistor (TFT) at medical ultrasound frequencies. In addition, the transducers are piezoelectric transducer (PZT), mechanically diced and bonded to a flexible circuit, which is difficult to scale to large areas because of interconnect and signal distribution problems. U.S. Pat. No. 5,456,256 describes a 2D solid state array with focusing in transmitter and receiver. Focusing is performed using a time-delay and sum algorithm. The time delay is executed by a high speed multiplexer to select the correct time delay for each element. This technique is difficult to scale to large area arrays because it requires complicated timing between individual pixels for focusing and requires high speed and high precision electronics, especially at medical ultrasound frequencies. U.S. Pat. Nos. 5,483,963 and 6,552,841 describe a 2D focal plane array that uses the same array elements for transmit and receive and also utilizes a lens for incoherent imaging. Complementary Metal Oxide Semiconductor (CMOS) mixers are used for detection of in-phase and quadrature signals. This technique does not teach mixing with low speed electronics or with a diode front-end. Furthermore, there is no teaching on how the common range gate signal may be modified to provide a common reference signal. This technique also requires many high speed CMOS elements that perform a lot of processing operations before the data may be stored. This technique, therefore, is not suitable for polysilicon TFT arrays. None of these techniques are scalable for large areas, low-cost imagers.

SUMMARY

One disclosed feature of the embodiments is a technique for coherent ultrasonic imaging. A receiver array has a plurality of receiver elements on a substrate to detect in-phase and quadrature components of a received signal corresponding to a transmit signal. Each of the receiver elements includes a receiver transducer and a thin-film transistor (TFT) receiver circuit. The TFT receiver circuit includes a quadrature detector having a mixer to mix a received signal with a reference signal in a composite bias signal that is distributed across the plurality of receiver elements. A transmitter is acoustically coupled to the plurality of receiver elements to generate the transmit signal through an imaging medium.

BRIEF DESCRIPTION OF THE DRAWINGS

Embodiments may best be understood by referring to the following description and accompanying drawings that are used to illustrate various embodiments. In the drawings.

DETAILED DESCRIPTION

Figure 1:
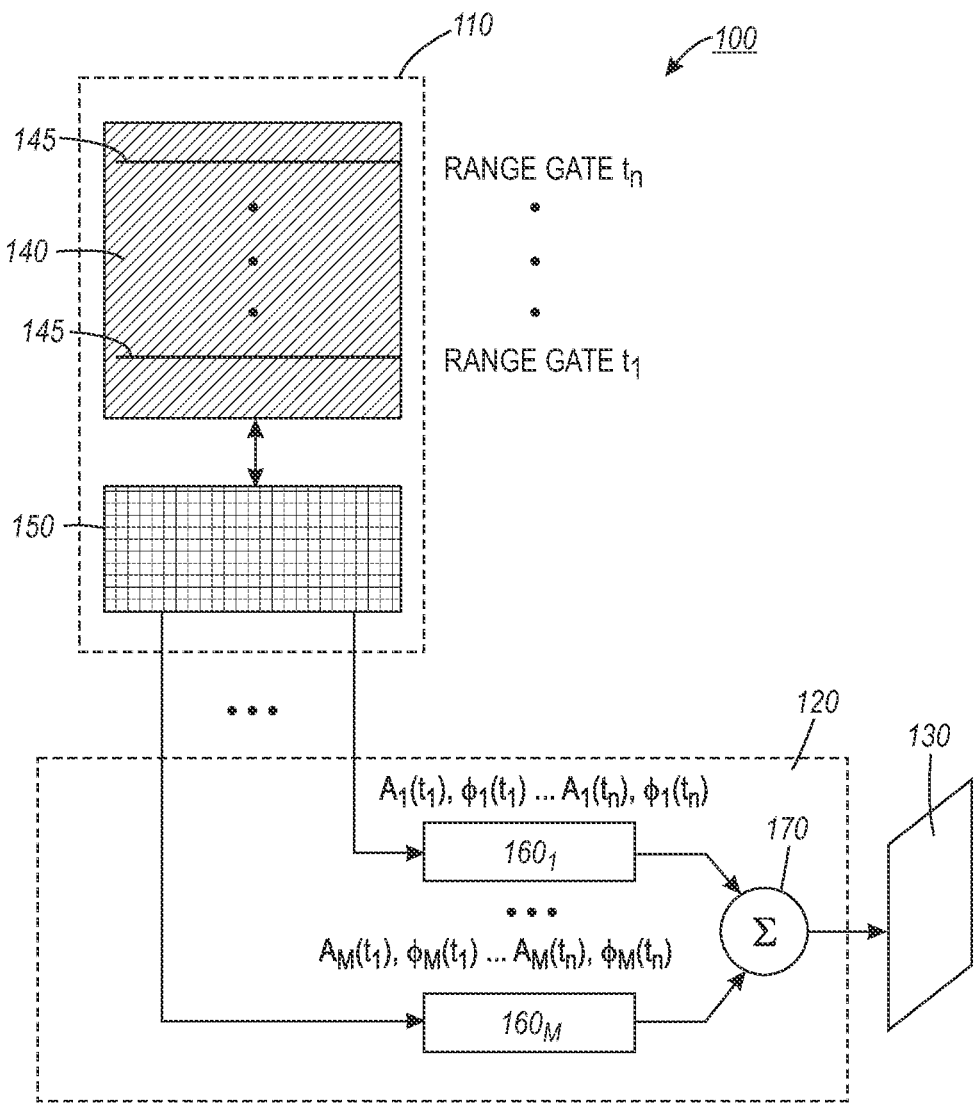
FIG. 1 is a diagram illustrating a system according to one embodiment.

One disclosed feature of the embodiments is a technique for coherent ultrasonic imaging. A transmitter is acoustically coupled to the plurality of receiver elements to generate a transmit signal through an imaging medium. An array of receive elements, each consisting of a thin-film transistor (TFT) circuit and an ultrasonic receive transducer (polymer, piezoelectric, MEMs, or otherwise) is constructed onto a large-area substrate. The receiver TFT circuit utilizes a range gate signal to trigger the collection of ultrasonic data from all elements in the array, simultaneously. The range gate signal further includes a reference signal (sinusoidal or otherwise), in addition to the normal direct current (DC) bias signal. The nonlinearity in the diode/transistor of the receiver circuitry is used to mix the reference and collected ultrasonic signals. By modifying the reference signal, in-phase and quadrature signals may be collected simultaneously across all elements in the ultrasonic array and used for coherent imaging.

One disclosed feature of the embodiments may be described as a process which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a program, a procedure, a method of manufacturing or fabrication, etc. One embodiment may be described by a schematic drawing depicting a physical structure. It is understood that the schematic drawing illustrates the basic concept and may not be scaled or depict the structure in exact proportions.

One disclosed feature of the embodiments is a method and apparatus for coherent C-mode ultrasound system that leverages the large-area, low-cost advantages of the TFT technology.

The technique uses a novel acoustic stack structure, TFT pixel electronics, and a unique process of quadrature detection using a sampling/integration time period that may be longer than the period of the carrier frequency. The device has a novel structure that may include a TFT array built on a substrate and a receiver ultrasonic transducer coupled to the TFT array. The receiver transducer may include a plurality of receiver elements made of polymer such as polyvinylidene fluoride-trifluoroethylene (PVDF-TrFE). A separate ultrasonic transmitter may be acoustically coupled to the receiver by a number of methods. The transmitter may be deposited on surface of the receiver, on backside of the substrate, or on the imaging medium opposite of the receiver.

One disclosed feature of the embodiments is a technique that may solve many challenges of large-area ultrasound devices. The C-mode system is unique because the range gate signal contains the reference waveform or signal. This may allow the reference signal to be easily distributed across the entire pixel array since the bias contact has very large area and low electrical impedance. This method of contacting all the receiver pixels is very scalable to large areas.

This structure also allows the reference signal to be easily distributed across the entire pixel array since the bias signal contact has very large area and low electrical impedance. Compared other quadrature imaging devices, which provide reference signals on long traces to each pixel, the technique used in one disclosed feature of the embodiments is much more scalable to large areas. The electronics use an integration method of quadrature detection, which relaxes the speed and noise requirements of the electronics. In this device, the integration times may be many multiples of the period of the carrier frequency. This allows lower speed electronics, like polysilicon TFTs, to be used for quadrature detection. In addition, the signal strength can be increased by integration over larger periods, at the cost of axial resolution. This enables electronics with lower signal to be used.

FIG. 1 is a diagram illustrating a system 100 according to one embodiment. The system 100 includes an ultrasonic imaging unit 110, a processing circuit 120, and an image plane 130. The system 100 may include more or less than the above components. For example, the ultrasonic image unit 110 and the processing circuit unit 120 may be integrated into a single unit.

The ultrasonic imaging unit 110 may be part of a large aperture ultrasonic imaging system with a large-area TFT backplane. It may provide a low-cost TFTs for coherent ultrasound imaging. It includes an imaging medium 140 and an imaging structure 150. The imaging medium 140 may be a medium to be imaged. It may include n desired planes $145_1$ through $145_n$ in order to collect enough in-phase and quadrature information to coherently image one plane. The planes $145_1$ through $145_n$ may correspond to n range gates at times $t_1$ through $t_n$. The imaging structure 150 performs ultrasonic imaging using coherent detection on the imaging medium 140. It may generate quadrature detected signals that correspond to pixels of the image.

The processing circuit 120 is coupled to the ultrasonic imaging unit 110 to process the quadrature detected signals to form a focused image on the image plane 130. The processing circuit 120 may be implemented by hardware, firmware, or software, or any combination of the above. It may include a plurality of delay and phase shift elements $160_1$ to $160_M$ and an integrator 170. The delay and phase shift elements $160_1$ to $160_M$ may obtain amplitudes and phases of the quadrature detected signals $A_1(t_1), \phi_1(t_1) \ldots A_1(t_n), \phi_1(t_n), \ldots, A_M(t_1), \phi_M(t_1) \ldots A_M(t_n), \phi_M(t_n)$ corresponding to a plurality of range gates at times $t_1$ through $t_n$ for desired plane locations $145_1$ through $145_n$, respectively, in the imaging medium 140. The integrator 170 may integrate the amplitudes and phases of the quadrature detected signals to provide individual pixels of the focused image and project the pixels on the image plane 130. In one embodiment, the integrator 170 may be an adder.

Figure 2:
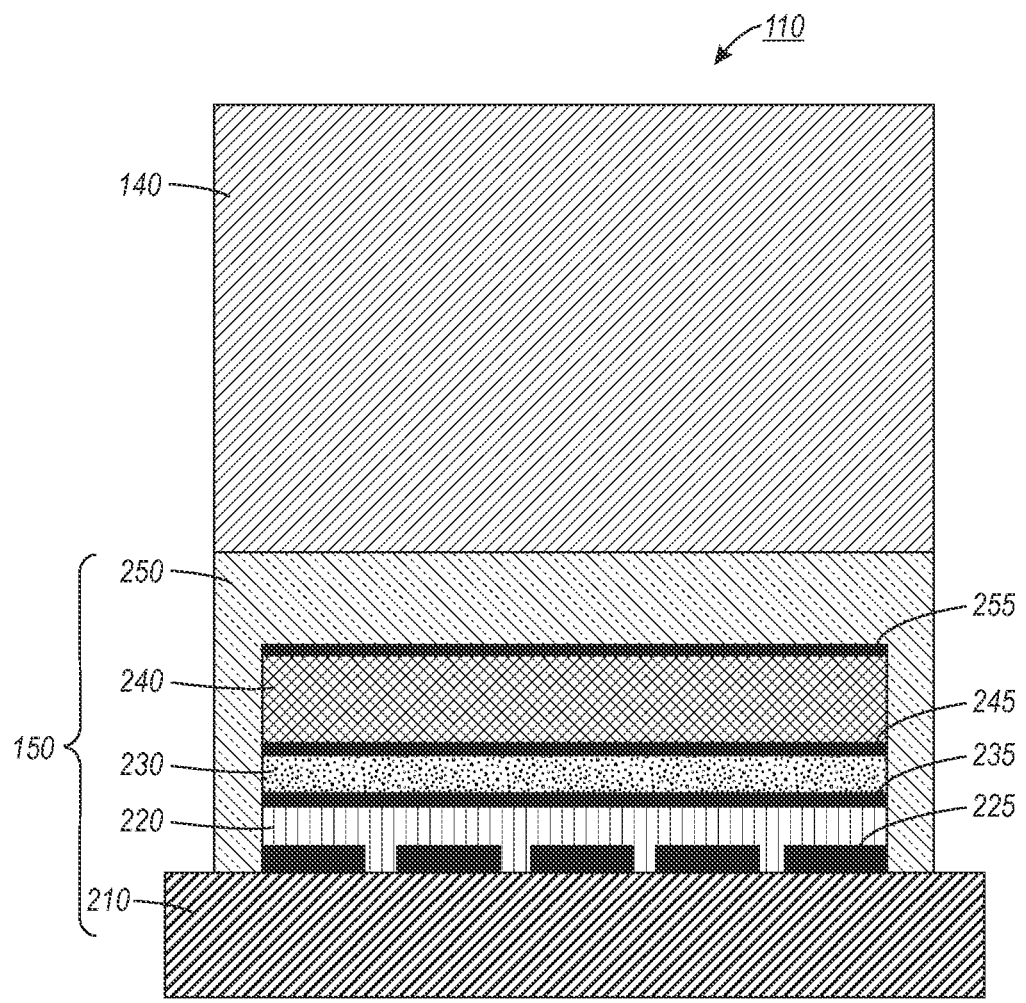
FIG. 2 is a diagram illustrating an ultrasonic imaging unit having a receiver generating a reference signal according to one embodiment.

FIG. 2 is a diagram illustrating the ultrasonic imaging unit 110 having a receiver generating a reference signal according to one embodiment. The ultrasonic imaging unit 110 includes the imaging medium 140 and the imaging structure 150. The imaging structure 150 includes a substrate 210, a receiver array 220, a dielectric 230, a transmitter 240, and an encapsulator 150. The imaging structure 150 may include more or less than the above elements. The acoustic stack has separate receiver and transmitter. Having separate transmit and receive transducers may be advantageous to eliminate the need for complicated electronics, such as high voltage transmit/receive switches, in each pixel. The high voltages needed on transmit may be separated both physically and electrically from the receivers. This may reduce the complexity of the pixel electronics by eliminating the high voltage transmit/receive switch common to most ultrasonic systems. This greatly simplifies the pixel electronics and enables the use of TFTs.

The substrate 210 may be any suitable substrate such as glass, stainless steel, or flexible polyimides.

The receiver array 220 is deposited on the substrate 210 and may have a plurality of receiver elements to detect in-phase and quadrature signals. Each of the receiver elements may include a receiver transducer and a thin-film transistor (TFT) receiver circuit in a TFT array 225. The TFT array 225 may be deposited on the substrate 210. It may be amorphous or polysilicon. The receiver transducer may be made of polyvinylidene fluoride-trifluoroethylene (PVDF-TrFE). Using PVDF-trFE is advantageous for many reasons. First, the individual receiver elements do not need to be mechanically separated because they exhibit little cross-coupling due to the high loss in the material. Second, it is easily spun or laminated onto the TFT surface with bottom electrode contacts and is highly compatible with the TFT process. Third, it is very lossy, which means there is very little crosstalk and elements do not need to be diced. This is advantageous on large area arrays with small pixel sizes that have too many elements to dice and fabricate interconnects in a cost-effective way.

On the receiver array 220 is a conductive layer 235 which may contain a composite bias signal that is distributed across the plurality of receiver elements. The composite bias signal may be a combination of a range gate signal and a reference signal. The composite bias signal, or Rbias signal, therefore may cover the entire array 225 and is common to all the receiver elements, resulting in simple circuit fabrication. The receiver circuit in each of the receiver elements may include a quadrature detector having a mixer to mix a received signal with a reference signal contained in the composite bias signal. Accordingly, the structure may enable easy electrical distribution for the reference signal through the low impedance, bias electrode, which covers the entire array area and is common to all receiver elements.

The dielectric 230 may be any suitable dielectric or electrical insulator. It may be needed when the transmitter 240 is stacked on the receiver 220.

The transmitter 240 is acoustically coupled to the plurality of receiver elements in the receiver 220 to generate a transmit signal through the imaging medium 140. The transmit signal may then be received by the receiver 220 using a pulse-echo technique. The transmitter 240 may have a ground layer 245 and a hot electrode layer 255.

The encapsulator 250 encapsulates the entire acoustic stack on the substrate 210. The encapsulator 250 is interfaced to the imaging medium 140.

The acoustic stack may be modified so that a single transducer can perform one or more functions as the receiver, transmitter, or reference sensors. Other transducer materials, such as electrets, PZT, or capacitive membrane ultrasound transducers (CMUTs) may also be used. For transducer materials with high crosstalk levels, dicing and filling between elements may be necessary. In addition, separation layers between different sensors can be used. Separating components may be necessary to prevent shorting of the Rbias electrode and transmitter electrodes. They may also be necessary if high voltages placed on the transmitter are a concern to the operation of the TFTs.

Back absorbing layers, such as epoxy loaded with tungsten particles or Eccosorb CR-124 may be use to attenuate spurious reflected signals on the backside of the array.

Figure 3:
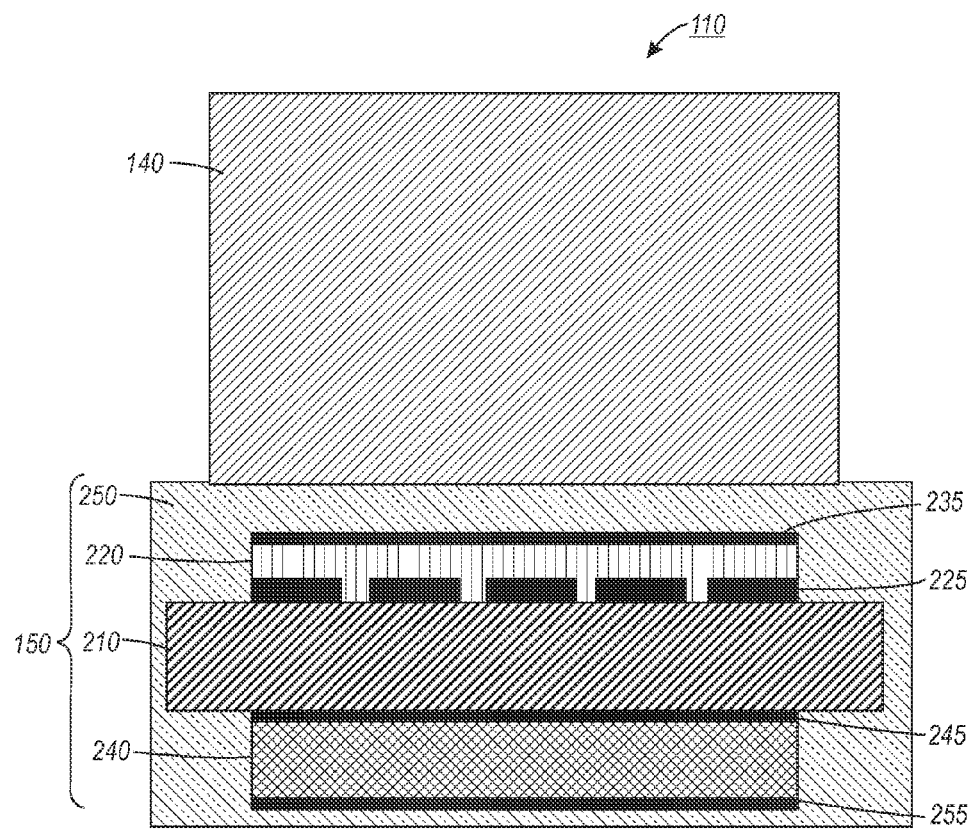
FIG. 3 is a diagram illustrating an ultrasonic imaging unit having a transmitter on backside of the substrate according to one embodiment.

FIG. 3 is a diagram illustrating the ultrasonic imaging unit 110 shown in FIG. 1 having a transmitter on backside of the substrate according to one embodiment.

The transmitter 240 may be located on the underside of the substrate 210 instead of located on the surface of the receiver 220. If the thickness of the substrate 210 is controlled correctly, the substrate 210 and PVDF may effectively match the transmitter 240 to water. In this configuration, no insulating material is needed to separate the transmitter and receiver electrodes. This may be a preferred configuration, especially in medical imaging, because the high voltage electrode would not be placed against the patient's skin.

Figure 4:
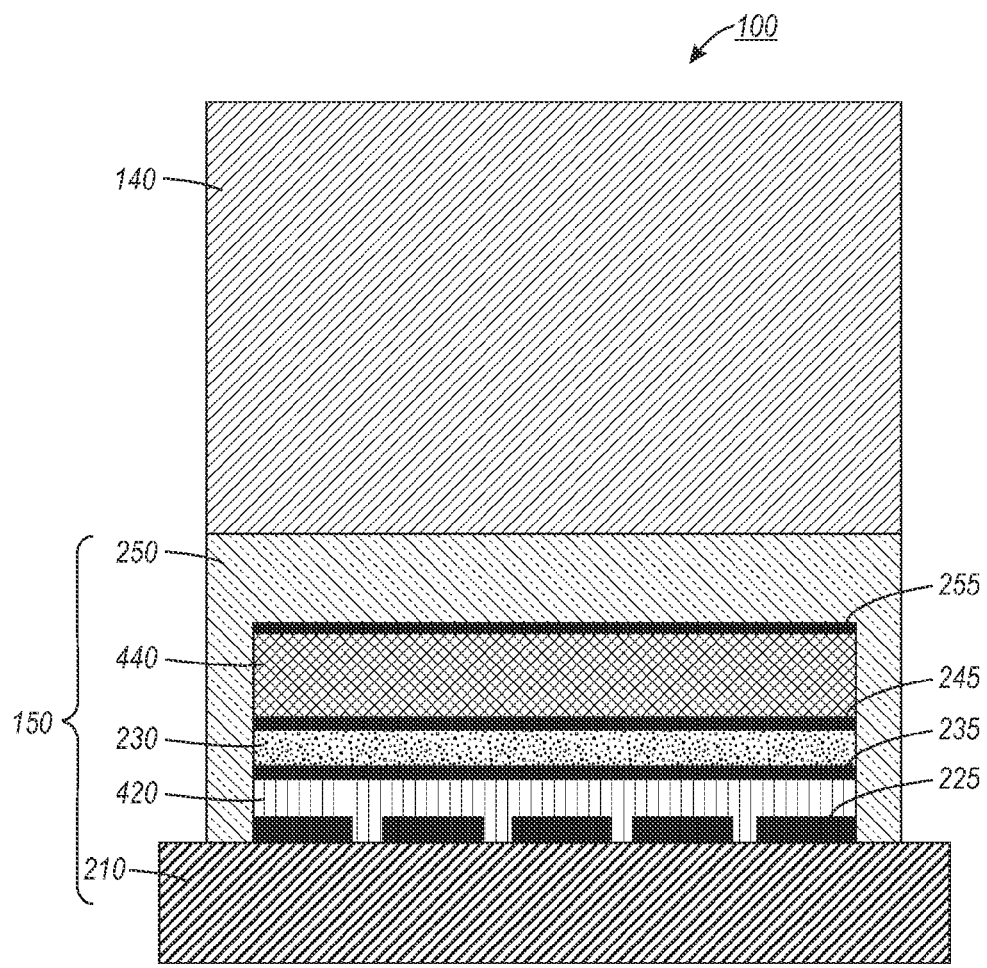
FIG. 4 is a diagram illustrating an ultrasonic imaging unit having a transmitter generating a reference signal according to one embodiment.

FIG. 4 is a diagram illustrating an ultrasonic imaging unit 110 having a transmitter generating a reference signal according to one embodiment. This configuration may have similar stack structure as in FIG. 2. The difference is that the transmitter 440 includes circuitry to generate the reference signal that is embedded in the composite bias signal. The receiver 420 does not have to generate this reference signal.

Figure 5:
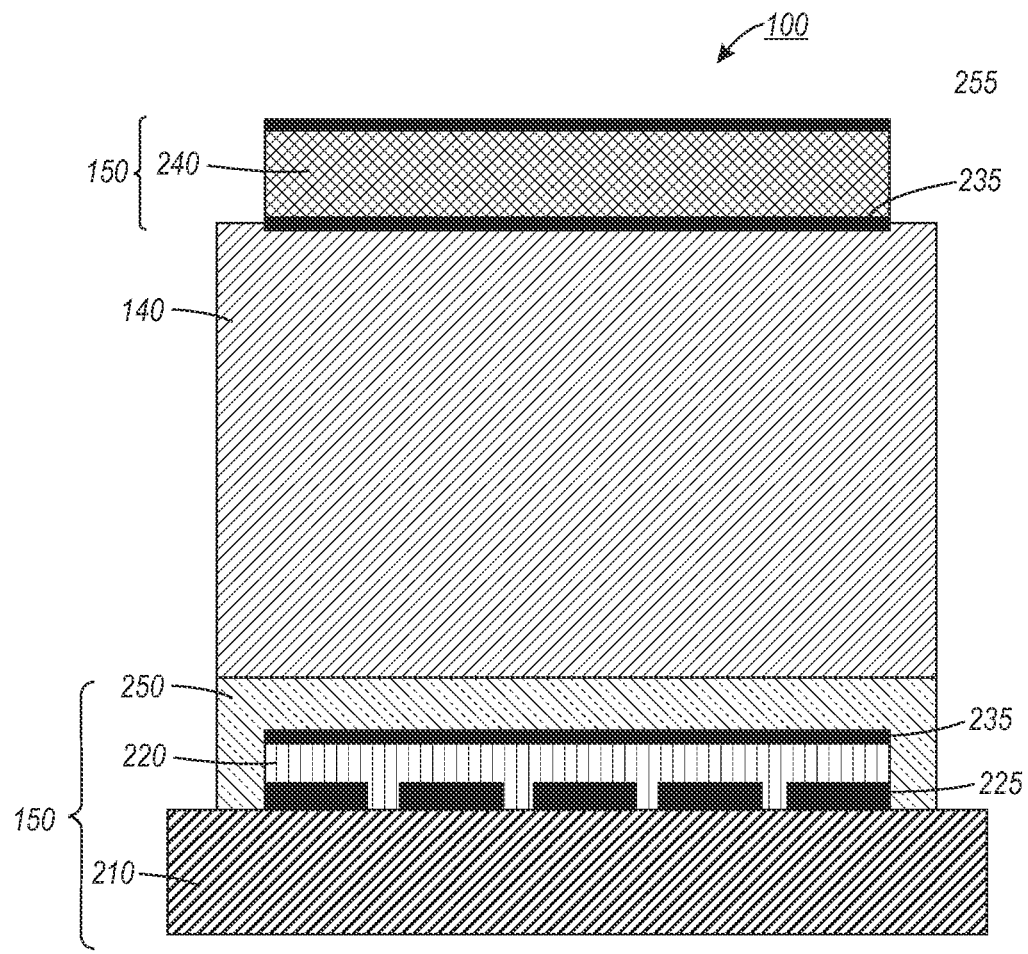
FIG. 5 is a diagram illustrating an ultrasonic imaging unit having a receiver and a transmitter on opposite sides of the imaging medium according to one embodiment.

FIG. 5 is a diagram illustrating an ultrasonic imaging unit 110 having a receiver and a transmitter on opposite sides of the imaging medium according to one embodiment. In this configuration, the receiver 220 and the transmitter 240 do not have to be co-planar. The transmitter 240 may be deposited on the imaging medium 140 opposite of the receiver 220. This may reduce the size of the encapsulator 250.

Figure 6:
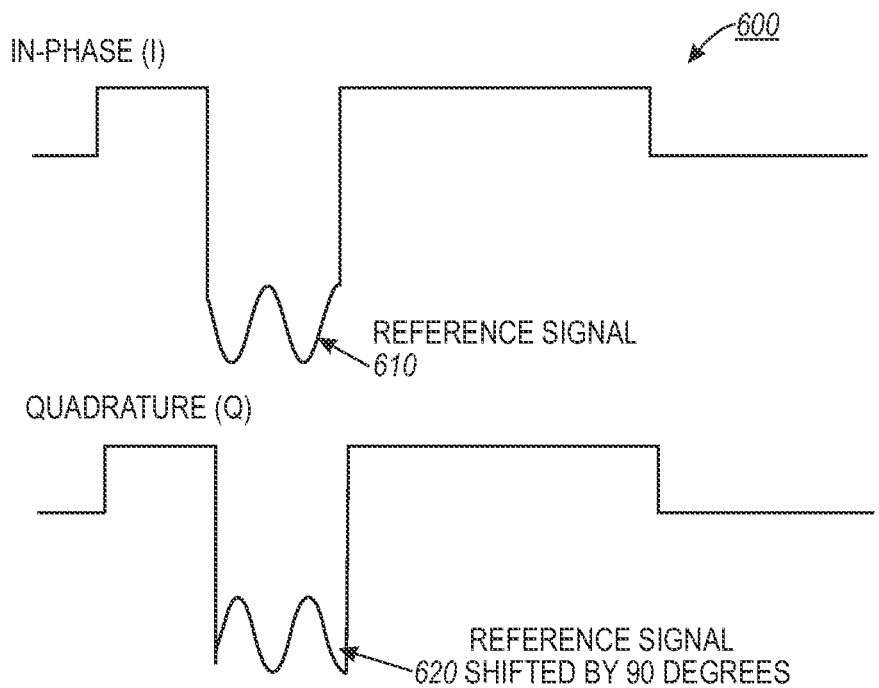
FIG. 6 is a diagram illustrating range gate signals for in-phase and quadrature components according to one embodiment.

FIG. 6 is a diagram illustrating composite bias signals 600 for in-phase and quadrature components according to one embodiment. The composite bias signal has the range gate signal and the reference signal. For the in-phase (I) component, the reference signal 610 is a sinusoidal signal. For the quadrature (Q) component, the reference signal 620 is the sinusoidal signal 610 shifted by 90 degrees.

Figure 7:
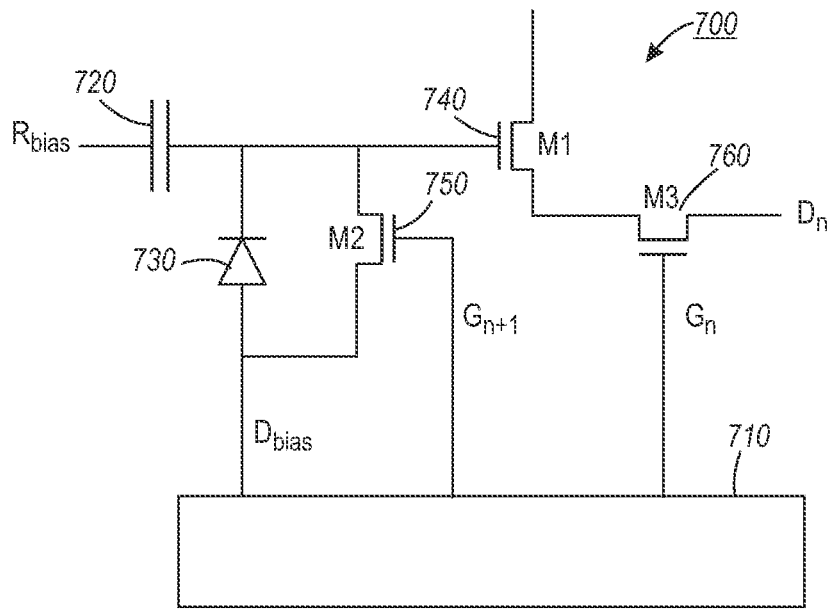
FIG. 7 is a diagram illustrating a receiver circuit according to one embodiment.

FIG. 7 is a diagram illustrating a receiver circuit 700 according to one embodiment. The receiver circuit 700 includes a control circuit 710, a receiver transducer 720, a mixer 730, and three switches M1 740, M2 750, and M3 760. The receiver circuit 700 may include more or less than the above components. The receiver circuit 700 receives a received signal from the transmit signal as generated by the transmitter 240 and generates a detected signal at $D_n$.

The control circuit 710 generates timing and control signals such as the range gate signal, the integration signal and control signals to the switches M1 740, M2 750, and M3 760. The control circuit 710 generates the composite bias signal that is a combination of a range gate signal and a reference signal. The range gate signal activates an integration time period that is longer than a carrier frequency period. The reference signal may be synchronized with the transmit signal and has same frequency with the transmit signal. The switches M1 740, M2 750, and M3 760 may be any suitable switching devices such as transistors.

The receiver element 720 may be a polymer as discussed above. The mixer 730 may be implemented by a diode. Any non-linear circuit element, such as a transistor, varactor, etc., may be used as the mixer 730. Another variation is to use an electrostatic transducer, such as a CMUT or ferro-electret, whose displacement/pressure is proportional to the square of the voltage between the plates. These transducers are nonlinear elements, and if a reference voltage signal were applied to one of the plates at a particular time, the mixing would occur directly as a result of the transducer properties. The nonlinear nature of tissue or the object being imaged may also be used as the mixer 730.

The receiver circuit 700 uses an integration method of quadrature detection, which enables the use of low-speed, polysilicon electronics. In addition, compared to other C-mode systems with complex mixers, high speed sampling, and analog-to-digital converters (ADCs) in each pixel, the electronics design of the receiver circuit 700 is very simple. This eliminates problems such as distributing a high-fidelity reference signal between pixels and matching analog mixers across pixels. Before data acquisition, the charge on the receiver circuit 700 and parasitic charges in the pixel is cleared by activating the switch M2 750. Then, the DC component of the Rbias waveform biases the diode 730 at a particular range gate, where the nonlinear nature of the diode 730 acts as a mixer. This mixes the received ultrasound signal by the Rbias sinusoidal reference signal or a reference signal shifted by 90 degrees in the in-phase and quadrature components as shown in FIG. 6. After mixing, the resulting current is integrated on the receiver capacitance over a time that is longer than, such as an integer multiple of, the period of the carrier frequency. This integrated signal is proportional to the real and imaginary components of the baseband received signal that contains information about the reflectivity of the environment at a certain range gate. These in-phase (I) and quadrature (Q) values are read off using control signals $G_n$ and $G_{n+1}$ and digitized using the processing circuit 120 shown in FIG. 1. The amplitude A and phase $\phi$ may then be calculated off-chip by $(I^2+Q^2)/2$ and atan (Q/I), respectively. The advantage of a long integration time equal to the period of many cycles of the carrier frequency is that low speed electronics can be used. In addition, since the signals are collected by integration, the signal strength may be traded for axial resolution and imaging speed; this may be important in circuits with low signal to noise ratio, such as polysilicon TFTs.

To form a focused image at a particular plane, the phase and amplitude information from numerous C-scan planes may be collected as shown in FIG. 1. The total time over which the amplitude and phase needs to be collected is given by the maximum of the time delays to every point in the plane from all transducers in the array. The minimum range gate sampling rate is $Bf_0$, where B is the bandwidth of the transmit signal and $f_0$ is the center frequency of the signal. This sampling rate determines the minimal spacing of C-scans from which a phase shift and sum beam forming algorithm may be needed to form a focused image at a particular plane and limits the imaging rate of the system.

A number of modifications may be made to the above circuit.

One modification is that more than one capacitor may be present to store I and Q components before the data is read off. This would require some extra sets of switches in the pixel.

The above discussion is for pulse-echo imaging. However, the method of collecting phase and quadrature information may be adopted for transmission imaging. This is accomplished by changing the relative positions of the transmitter 240 and receiver 220. In transmission imaging, phase and amplitude information may be used to reconstruct a hologram of the object being imaged. Additionally, this information may be used to extract attenuation, speed of sound, or other material characteristics. In this sense, the circuit may be used to collect phase and amplitude data that can then be processed by tomographic or holographic algorithms. This method of I and Q generation may be used for other modalities other than ultrasound such as IR, electromagnetic, and other forms of radiation that require coherent imaging, provided that the frequency is low enough for use by TFTs.

Figure 8:
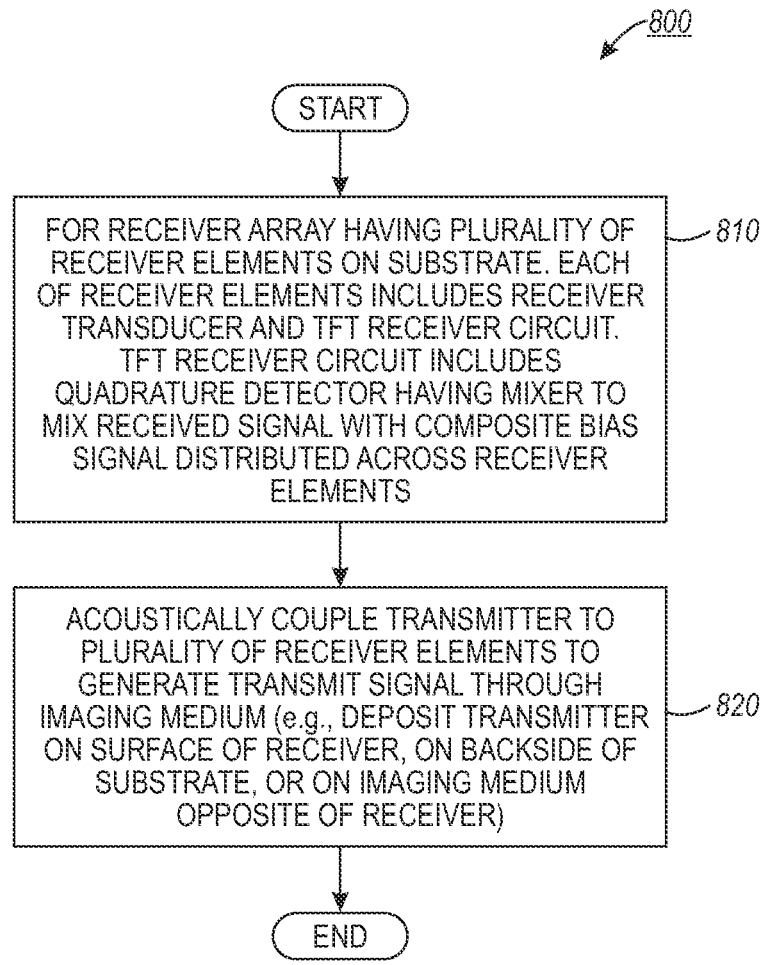
FIG. 8 is a flowchart illustrating a process for constructing an ultrasonic imaging unit according to one embodiment.

FIG. 8 is a flowchart illustrating a process 800 for constructing an ultrasonic imaging unit according to one embodiment.

Upon START, the process 800 forms a receiver array having a plurality of receiver elements on a substrate (Block 810). Each of the receiver elements may include a receiver transducer and a thin-film transistor (TFT) receiver circuit. The TFT receiver circuit may include a quadrature detector having a mixer to mix a received signal with a composite bias signal distributed across the plurality of receiver elements. Forming the receiver array includes forming a control circuit to generate the composite bias signal that is a combination of a range gate signal and a reference signal, the range gate signal activating an integration time period that is longer than a carrier frequency period.

Next, the process 800 acoustically couples a transmitter to the plurality of receiver elements to generate a transmit signal through an imaging medium (Block 820). The transmitter may be deposited on surface of the receiver, on backside of the substrate, or on the imaging medium opposite of the receiver. The process 800 is then terminated.

Figure 9:
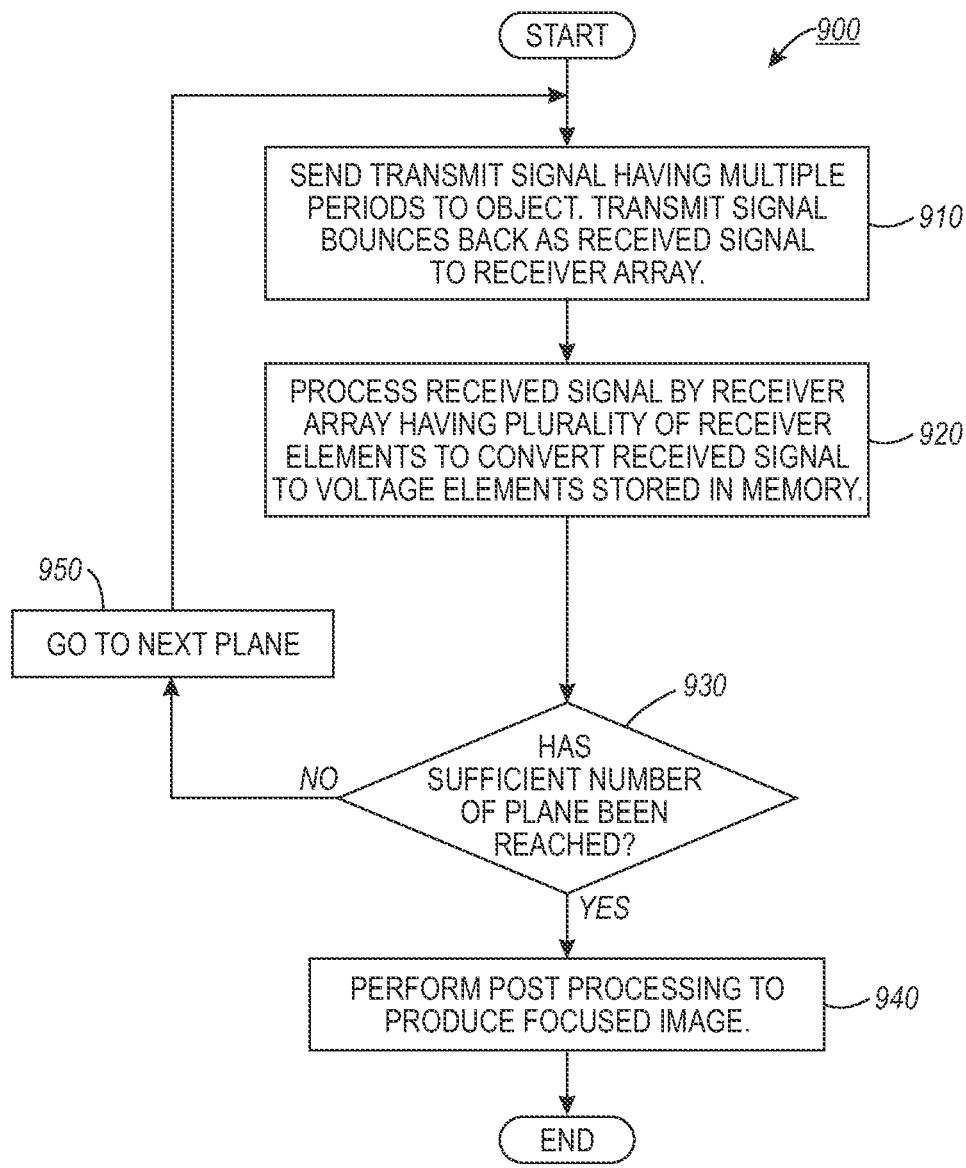
FIG. 9 is a flowchart illustrating a process to perform ultrasonic imaging using the imaging unit according to one embodiment.

FIG. 9 is a flowchart illustrating the process 900 to perform ultrasonic imaging using the imaging unit as formed in the process 800 according to one embodiment.

Upon START, the process sends a transmit signal having multiple periods by a transmitter to an object (Block 910). When striking the object, the transmit signal bounces back as a received signal to a receiver array. Next, the process 900 processes the received signal by the receiver array having a plurality of receiver elements to convert the received signal to voltage elements stored in a memory (Block 920).

Then, the process 900 determines if a sufficient number of planes has been reached (Block 930). If not, the process 900 goes to Block 950 to go to the next plane and then return to block 910. Otherwise, the process 900 performs post-processing to produce a focused image on an image plane (Block 940). Performing post-processing may include calculating a time or phase delay from an element to an imaging plane for each pixel in focus, and summing time or phase-shifted signals to provide individual pixels of a focused image corresponding to the object. This may include obtaining the amplitudes and phases of the detected signals corresponding to a plurality of desired plane locations $145_1$ through $145_n$ and integrating the amplitudes and phases as shown in FIG. 1. The process 900 is then terminated.

Figure 10:
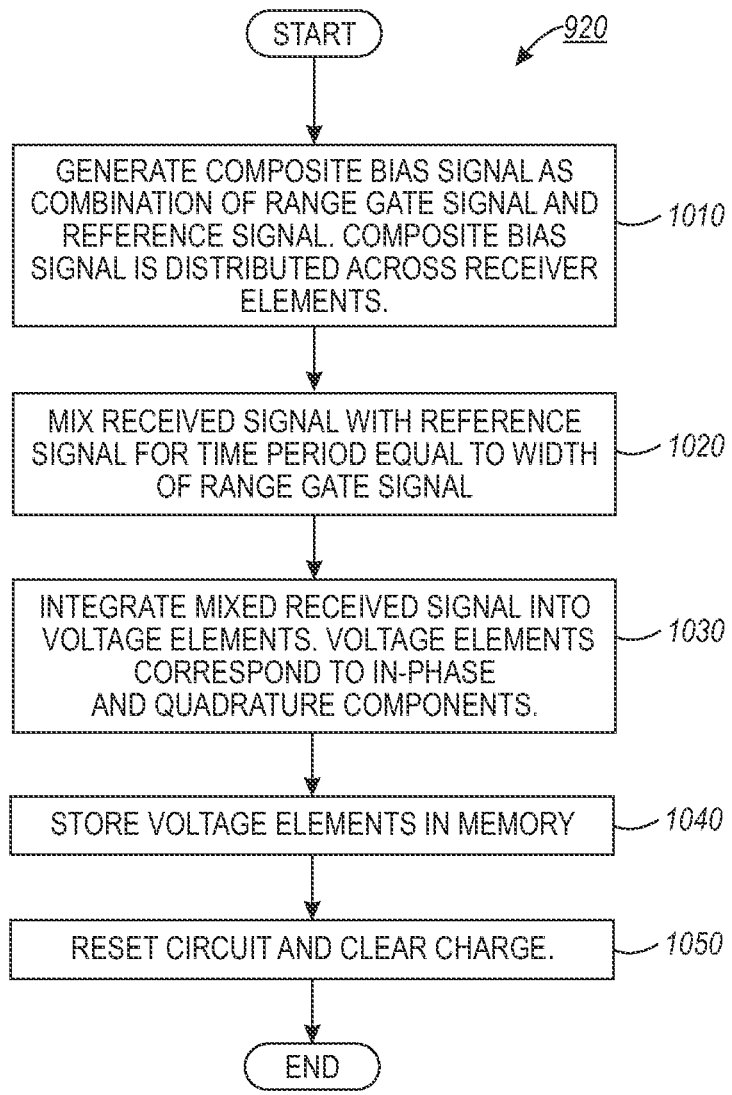
FIG. 10 is a flowchart illustrating a process to process a received signal according to one embodiment.

FIG. 10 is a flowchart illustrating the process 920 to process the received signal shown in FIG. 9 according to one embodiment.

Upon START, the process 920 generates a composite bias signal which is a combination of a range gate signal and a reference signal (Block 1010). The range gate signal may have a period longer than a carrier frequency. The composite bias signal may be distributed across the receiver elements. Next, the process 920 mixes the received signal with the reference signal in the composite bias signal for a time period equal to width of the range gate signal (Block 1020). Then, the process 920 integrates the mixed received signal into the voltage elements (Block 1030). The voltage elements may correspond to the in-phase and quadrature components. Next, the process 920 stores the voltage elements in the memory (Block 1040). Then, the process 920 resets the circuit and clears the charge (Block 1050). The process 920 is then terminated.

Figure 11:
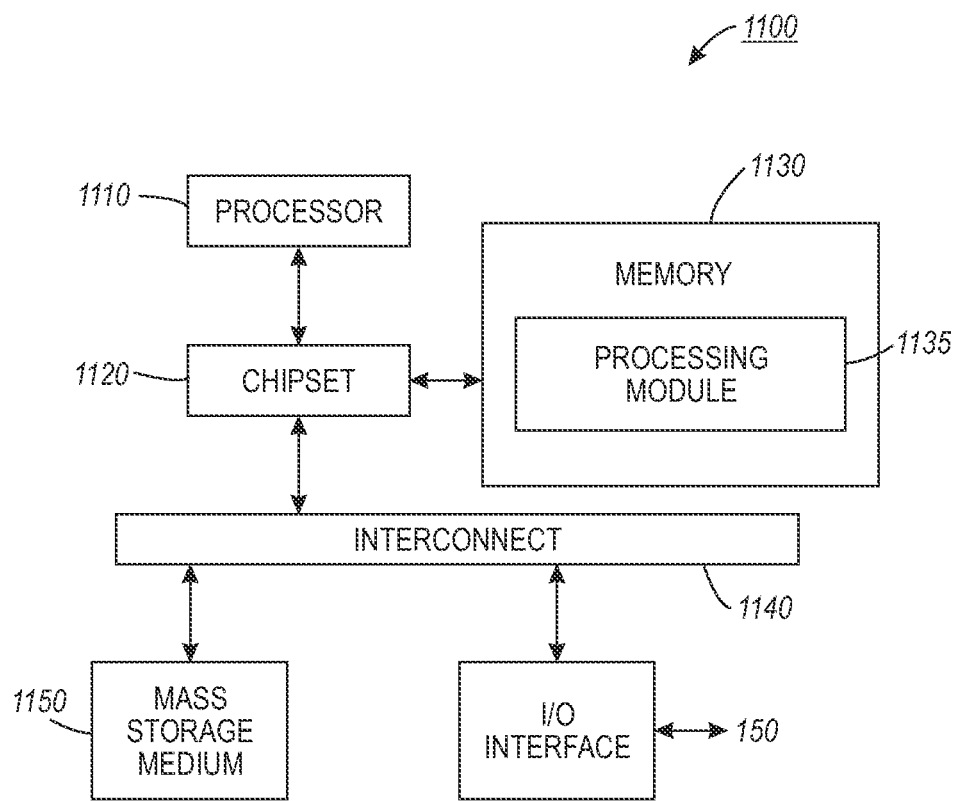
FIG. 11 is a diagram illustrating a processing system according to one embodiment.

FIG. 11 is a diagram illustrating a processing system 1100 to perform centralized multimedia access according to one embodiment. The processing system 1100 may be a part of a computer system or a mobile device. It may include a processor 1110, a chipset 1120, a memory 1130, an interconnect 1140, a mass storage medium 1150, an input/output (I/O) interface 1160. The processing system 1100 may include more or less than the above components.

The processor 1110 may be a central processing unit of any type of architecture, such as processors using hyper threading, security, network, digital media technologies, single-core processors, multi-core processors, embedded processors, mobile processors, micro-controllers, digital signal processors, superscalar computers, vector processors, single instruction multiple data (SIMD) computers, complex instruction set computers (CISC), reduced instruction set computers (RISC), very long instruction word (VLIW), or hybrid architecture.

The chipset 1120 provides control and configuration of memory and input/output (I/O) devices such as the memory 1130, the mass storage medium 1150, and the network interface card 1160. The chipset 1120 may integrate multiple functionalities such as I/O controls, graphics, media, host-to-peripheral bus interface, memory control, power management, etc.

The memory 1130 stores system code and data. The memory 1130 is typically implemented with dynamic random access memory (DRAM), static random access memory (SRAM), or any other types of memories including those that do not need to be refreshed, including read only memory (ROM), flash memories. In one embodiment, the memory 1130 may contain a processing module 1135. It is contemplated that the processing module 1135, or any of its components, may be implemented by hardware, software, firmware, or any combination thereof. The processing module 1135 may perform any of the functions or operations described above, such as obtaining the amplitudes and phases of the quadrature detected signals corresponding to a plurality of range gates for desired plane locations in the imaging medium, and/or integrating the amplitudes and phases of the quadrature detected signals to provide individual pixels of the focused image.

The interconnect 1140 provides an interface for the chipset 1120 to communicate with peripheral devices such as the mass storage medium 1150 and the I/O interface 1160. The interconnect 1140 may be point-to-point or connected to multiple devices. For clarity, not all the interconnects are shown. It is contemplated that the interconnect 540 may include any interconnect or bus such as Peripheral Component Interconnect (PCI), PCI Express, Universal Serial Bus (USB), and Direct Media Interface (DMI), etc. The mass storage medium 1150 may include compact disk (CD) read-only memory (ROM), memory stick, memory card, smart card, digital video/versatile disc (DVD), floppy drive, hard drive, tape drive, and any other electronic, magnetic or optic storage devices. The mass storage device provides a mechanism to read machine-accessible media. The I/O interface 1160 provides interface to I/O devices such as the imaging structure 150.

Elements of one embodiment may be implemented by hardware, firmware, software or any combination thereof. The term hardware generally refers to an element having a physical structure such as electronic, electromagnetic, optical, electro-optical, mechanical, electro-mechanical parts, etc. A hardware implementation may include analog or digital circuits, devices, processors, applications specific integrated circuits (ASICs), programmable logic devices (PLDs), field programmable gate arrays (FPGAs), or any electronic devices. The term software generally refers to a logical structure, a method, a procedure, a program, a routine, a process, an algorithm, a formula, a function, an expression, etc. The term firmware generally refers to a logical structure, a method, a procedure, a program, a routine, a process, an algorithm, a formula, a function, an expression, etc., that is implemented or embodied in a hardware structure (e.g., flash memory). Examples of firmware may include microcode, writable control store, micro-programmed structure. When implemented in software or firmware, the elements of an embodiment may be the code segments to perform the necessary tasks. The software/firmware may include the actual code to carry out the operations described in one embodiment, or code that emulates or simulates the operations. The program or code segments may be stored in a processor or machine accessible medium. The "processor readable or accessible medium" or "machine readable or accessible medium" may include any medium that may store or transfer information. Examples of the processor readable or machine accessible medium that may store include a storage medium, an electronic circuit, a semiconductor memory device, a read only memory (ROM), a flash memory, an erasable programmable ROM (EPROM), a floppy diskette, a compact disk (CD) ROM, an optical storage medium, a magnetic storage medium, a memory stick, a memory card, a hard disk, etc. The machine accessible medium may be embodied in an article of manufacture. The machine accessible medium may include information or data that, when accessed by a machine, cause the machine to perform the operations or actions described above. The machine accessible medium may also include program code, instruction or instructions embedded therein. The program code may include machine readable code, instruction or instructions to perform the operations or actions described above. The term "information" or "data" here refers to any type of information that is encoded for machine-readable purposes. Therefore, it may include program, code, data, file, etc.

All or part of an embodiment may be implemented by various means depending on applications according to particular features, functions. These means may include hardware, software, or firmware, or any combination thereof. A hardware, software, or firmware element may have several modules coupled to one another. A hardware module is coupled to another module by mechanical, electrical, optical, electromagnetic or any physical connections. A software module is coupled to another module by a function, procedure, method, subprogram, or subroutine call, a jump, a link, a parameter, variable, and argument passing, a function return, etc. A software module is coupled to another module to receive variables, parameters, arguments, pointers, etc. and/or to generate or pass results, updated variables, pointers, etc. A firmware module is coupled to another module by any combination of hardware and software coupling methods above. A hardware, software, or firmware module may be coupled to any one of another hardware, software, or firmware module. A module may also be a software driver or interface to interact with the operating system running on the platform. A module may also be a hardware driver to configure, set up, initialize, send and receive data to and from a hardware device. An apparatus may include any combination of hardware, software, and firmware modules.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method comprising:
   sending a transmit signal having multiple periods by a transmitter to an object, the transmit signal bouncing back as a received signal to a receiver array; and
   processing the received signal by the receiver array having a plurality of receiver elements to convert the received signal to a voltage stored in a memory, processing the received signal comprising:
   generating a composite bias signal which is a combination of a range gate signal and a reference signal, the range gate signal having a period longer than a carrier frequency, the composite bias signal being distributed across the receiver elements, and
   mixing the received signal with the reference signal for a time period equal to width of the range gate signal.

2. The method of claim 1 further comprising:
   determining if a sufficient number of planes has been reached; and
   performing post-processing, performing post-processing comprising:
   calculating a time or phase delay from an element to a plane for each pixel in focus, and
   summing time or phase-shifted signals to provide individual pixels of a focused image corresponding to the object.

3. The method of claim 1 wherein processing the received signal further comprises:
   integrating the mixed received signal into the voltage;
   storing the voltage in a storage element of the memory; and
   resetting and clearing charge.

\* \* \* \* \*